United States Patent
Castelain et al.

(10) Patent No.: US 8,040,867 B2
(45) Date of Patent: Oct. 18, 2011

(54) METHOD OF MULTI-ANTENNA WIRELESS DATA EMISSION, EMITTER AND RECEIVER USING THE METHOD

(75) Inventors: Damien Castelain, Rennes Cedex (FR); Loic Brunel, Rennes Cedex (FR); David Mottier, Rennes Cedex (FR); Cristina Ciochina, Rennes Cedex (FR)

(73) Assignee: Mitsubishi Electric Corporation, Tokyo (JP)

( * ) Notice: Subject to any disclaimer, the term of this patent is extended or adjusted under 35 U.S.C. 154(b) by 80 days.

(21) Appl. No.: 12/526,849

(22) PCT Filed: Jan. 25, 2008

(86) PCT No.: PCT/EP2008/000565
§ 371 (c)(1),
(2), (4) Date: Sep. 16, 2009

(87) PCT Pub. No.: WO2008/098670
PCT Pub. Date: Aug. 21, 2008

(65) Prior Publication Data
US 2010/0014413 A1    Jan. 21, 2010

(30) Foreign Application Priority Data

Feb. 15, 2007  (EP) .................................... 07003191
Mar. 30, 2007  (EP) .................................... 07006681

(51) Int. Cl.
*H04J 1/00*    (2006.01)

(52) U.S. Cl. .................... 370/343; 370/345; 375/267
(58) Field of Classification Search .................. None
See application file for complete search history.

(56) References Cited

U.S. PATENT DOCUMENTS

| 2005/0058217 | A1* | 3/2005 | Sandhu et al. ................ 375/267 |
| 2006/0093066 | A1 | 5/2006 | Jeong et al. |
| 2006/0215541 | A1 | 9/2006 | Kwun et al. |

FOREIGN PATENT DOCUMENTS

| EP | 1 655 875 | 5/2006 |
| EP | 1 705 823 | 9/2006 |
| EP | 1 755 231 | 2/2007 |

OTHER PUBLICATIONS

U.S. Appl. No. 12/526,551, filed Aug. 10, 2009, Castelain, et al.
U.S. Appl. No. 12/526,985, filed Aug. 13, 2009, Castelain, et al.

\* cited by examiner

*Primary Examiner* — Kevin C Harper
(74) *Attorney, Agent, or Firm* — Oblon, Spivak, McClelland, Maier & Neustadt, L.L.P.

(57) ABSTRACT

A method and device in the domain of wireless communication, and more specifically coding and decoding schemes useful in the context of MIMO (Multiple Input Multiple Output) or MISO (Multiple Input Single Output) communications especially used in conjunction of OFDM-like transmission schemes. A space frequency block code applies some well chosen two by two space frequency block codes to each pair of frequencies $\kappa$ and $\kappa+N/2$. The proposed SFBC keep the constant envelope property for each antenna while leading to a good performance by introducing some spatial diversity.

20 Claims, 6 Drawing Sheets

Background Art

|  | T1 | T2 |
|---|---|---|
| Tx1 | a | -b* |
| Tx2 | b | a* |

|  | F1 | F2 |
|---|---|---|
| Tx1 | a | -b* |
| Tx2 | b | a* |

METHOD OF MULTI-ANTENNA WIRELESS DATA EMISSION, EMITTER AND RECEIVER USING THE METHOD

The invention concerns the domain of wireless communication, and more specifically the coding and decoding schemes useful in the context of MIMO (Multiple Input Multiple Output) or MISO (Multiple Input Single Output) communications especially used in conjunction of OFDM-like transmission schemes.

Orthogonal Frequency-Division Multiplexing (OFDM), like Coded OFDM (COFDM), is based upon the principle of frequency-division multiplexing (FDM), but is implemented as a digital modulation scheme. The bit stream to be transmitted is split into several parallel bit streams, typically dozens to thousands. The available frequency spectrum is divided into several sub-channels, and each low-rate bit stream is transmitted over one sub-channel by modulating a sub-carrier using a standard modulation scheme, for example PSK, QAM, etc. The sub-carrier frequencies are chosen so that the modulated data streams are orthogonal to each other, meaning that cross talk between the sub-channels is eliminated. This orthogonality occurs when sub-carriers are equally spaced by the symbol rate of a sub-carrier.

The primary advantage of OFDM is its ability to cope with severe channel conditions, for example, multipath and narrowband interference, without complex equalization filters. Channel equalization is simplified by using many slowly modulated narrowband signals instead of one rapidly modulated wideband signal.

A variation called DFT spread OFDM has been developed. In this system each symbol to be transmitted is spread over a set of transmitted frequencies by a DFT (Discrete Fourier Transform), the resulting signal is sent over a conventional OFDM transmission system.

FIG. 1 illustrates the coding implementation in the frequency domain for the transmitter. Actual implementation could be done either in the frequency domain or in the time domain while the implementation in the frequency domain should be preferred for simplicity, especially if a MIMO scheme is used, and to improve frequency separability between emitters emitting in different frequency bands. Data to be transmitted are coded and mapped on symbols by the coding and modulation module 1.1 giving a set of symbols $x_n$. Then the signal is spread in the frequency domain by the FFT (Fast Fourier Transform) module 1.2. Then occurs a step of frequency mapping 1.3, which can comprise zeros insertion, equivalent to oversampling in the time domain, frequency shaping, frequency transposition, and possibly filtering. When comprising zero insertion, the output of the frequency mapping module 1.3 results in a vector of size N' greater than N, if not N'=N which is assumed in the following for simplicity and without loss of generality. The signal is transformed back in the time domain by the IFFT (Inverse Fast Fourier Transform) 1.4 for transmission, giving back a set of symbols $x'_n$ very close, if not equal, to the $x_n$ symbols. An optional cyclic prefix insertion 1.5 can be applied before transmission.

FIG. 2 illustrates the decoding implementation in the frequency domain for the receiver. Received data are first synchronized in a step 2.1. If the coder has inserted cyclic prefix, they are removed in a step 2.2. Then, a fast Fourier transform 2.3 is applied to transform the signal in the frequency domain. Then an equalization step 2.4 occurs using data relatives to the channel conditions obtained by a step of channel estimation 2.7. Data are then despread by an inverse fast Fourier transform 2.5 before the demodulation and channel decoding step 2.6.

This system has good properties, in particular the transmitted signals keep a constant envelope. It is simple to implement with a MMSE (Minimum Mean Square Error) linear equalizer in the frequency domain especially when cyclic prefix are inserted in the signal.

It is known that the use of several antennas, at the emitter, leading to MISO system, or both at the emitter and the receiver, leading to MIMO systems allows the improvement of the robustness of the transmission. This improved robustness can be used to increase the range or the bandwidth by adjusting the classical range versus bandwidth tradeoff. Several diversity schemes could be used to take advantage of multiple antennas at the emitter.

Alamouti has developed a code that is a Space Time Block Code (STBC), because information to be transmitted is spread in space, by the different antennas, and in time, using different time slots. The reference paper regarding Alamouti codes is "A simple transmit diversity technique for wireless communications", IEEE J. Select. Areas Commun., vol. 16, pp. 1451-1458, October 1998. In a first implementation of Alamouti code it is contemplated two transmit antennas (Tx1 and Tx2), two symbols a and b sent in two time slots (T1 and T2), at time T1 antenna Tx1 transmits symbol a when antenna Tx2 transmits symbol b. At time T2 antenna Tx1 transmits symbol −b* when antenna Tx2 transmits symbol a*, where "*" denotes the complex conjugate. This is illustrated in FIG. 3a. This Alamouti code, has the advantage to offer a simple coding and decoding, the diversity is increased leading to better performance. It is to be noted that the throughput is not increased. The optimal (MAP for Maximum A Posteriori) decoding is very simple, it does not imply matrix inversion, log enumeration or sphere decoding as long as the channel does not vary between T1 and T2, and as long as the channel can be characterized by a simple multiplication. It is naturally well combined with OFDM or OFDM-like modulation schemes.

A second implementation of Alamouti code called OSFBC for Orthogonal Space Frequency Block Code is illustrated FIG. 3b. It is based on transmission of the data over two different frequencies (F1 and F2), and not over two different time slots. With 2 transmit antennas (Tx1 and Tx2), two symbols a and b sent on two frequencies (F1 and F2), on frequency F1 antenna Tx1 transmits symbol a when antenna Tx2 transmits symbol b. On frequency F2 antenna Tx1 transmits symbol −b* when antenna Tx2 transmits symbol a*. Let us call this Alamouti variant the usual code in frequency. Classically, the two frequencies are adjacent, to limit the variations of the channel. By definition, this scheme is applied to OFDM or OFDM-like modulation schemes. By OFDM-like modulations, we include some frequency-domain implementation of a single carrier scheme, in which preferably, but not strictly necessarily, a cyclic prefix has been added, like for example the described DFT-spread OFDM. Compared to STBC, the advantage of SFBC is the use of only one modulation slot, which can be advantageous for the multiplexing point of view, and may lead to better performance in case of very fast variations of the channel like high Doppler. The disadvantage is that the channel may vary between two frequencies, which may lead to degraded performances, or increase of the complexity of the receiver. Alamouti codes, due to their simple implementation and good performance are very attractive scheme to be used in MIMO transmission. Unfortunately, when applied to OFDM or OFDM-like modulation schemes, these codes do not have the valuable feature to produce signals with the constant envelope property for each antenna, the envelope being the modulus of the complex envelope. By the term constant envelope, we mean signals that have constant modulus at least when considered without oversampling. It could happen that oversampling break this good property while still leading to an advantageous envelope distribution compared with oversampling of a non constant envelope property signal.

The issue of the present invention is to design a space-frequency code, easy to code and to decode, that keeps the constant envelope property at each transmit antenna with good performance. Preferably and in order to simplify the decoding, an implementation of the present invention is made in the frequency domain at the receiver side. This implementation in the frequency domain at the receiver could be used with a transmitter implemented either in the frequency domain or the time domain at this transmitter.

To overcome these problems the invention proposes a space frequency block code applying a well chosen two by two space frequency block code to each pair of frequencies k and k+N/2. The proposed SFBC keeps the constant envelope property for each antenna while leading to performance close to an Alamouti SFBC performance.

The invention concerns a method of radio data emission, by an emitter comprising at least two transmit antennas, each antenna transmitting on at least an even number 'N', strictly greater than 2, of different frequencies, comprising a step of emitting on a first antenna during a given time slot on each frequency 'k', with k=0 to N−1, a signal representing a complex symbol '$X_k$' in the frequency domain; a step of emitting on a second antenna during the same time slot, on each frequency 'k', with k=0 to N−1, a signal representing a symbol '$Y_k$'; wherein for each index 'k', with k=0 to N/2−1, symbols '$Y_k$' and '$Y_{k+N/2}$' result from a space frequency block code applied to symbols '$X_k$' and '$X_{k+N/2}$', ck being defined as equal to cos(2πk/N), sk being defined as equal to j sin(2πk/N), said space frequency block code being defined by formula: $Y_k = \epsilon(c_k X_k - s_k X_{k+N/2})$, and $Y_{k+N/2} = \epsilon(-s_k X_k + c_k X_{k+N/2})$, where ϵ is 1 or −1.

The invention also concerns a method of radio data emission, by an emitter comprising at least two transmit antennas, each antenna transmitting on at least an even number 'N', strictly greater than 2, of different frequencies, comprising a step of emitting on a first antenna during a given time slot on each frequency 'k', with k=0 to N−1, a signal representing a complex symbol '$X_k$' in the frequency domain; a step of emitting on a second antenna during the same time slot, on each frequency 'k', with k=0 to N−1, a signal representing a symbol '$Y_k$'; wherein for each index 'k', with k=0 to N/2−1, symbols '$Y_k$' and '$Y_{k+N/2}$' result from a space frequency block code applied to symbols '$X_k$' and '$X_{k+N/2}$', ck being defined as equal to cos(2πk/N), sk being defined as equal to j sin(2πk/N), said space frequency block code is defined by formula: $Y_k = \epsilon(s_k X_k - c_k X_{k+N/2})$, and $Y_{k+N/2} = \epsilon(-c_k X_k + s_k X_{k+N/2})$, where ϵ is 1 or −1.

The invention also concerns a method of radio data emission, by an emitter comprising at least two transmit antennas, each antenna transmitting on at least an even number 'N', strictly greater than 2, of different frequencies, comprising a step of emitting on a first antenna during a given time slot on each frequency 'k', with k=0 to N−1, a signal representing a complex symbol '$X_k$' in the frequency domain; a step of emitting on a second antenna during the same time slot, on each frequency 'k', with k=0 to N−1, a signal representing a symbol '$Y_k$'; wherein for each index 'k', with k=0 to N/2−1, symbols '$Y_k$' and '$Y_{k+N/2}$' result from a space frequency block code applied to symbols '$X_k$' and '$X_{k+N/2}$', W being defined as equal to $e^{j2\pi/N}$, d being chosen between 1 and N−1, said space frequency block code is defined by formula: $Y_k = \epsilon W^{-dk} X_{k+N/2}$, $Y_{k+N/2} = \epsilon W^{-d(k+N/2)} X_k$, ϵ being equal to 1 or −1.

In a particular embodiment of the invention d is chosen equal to N/2.

In a particular embodiment of the invention, the method further comprises the step of obtaining the N symbols $X_k$ in the frequency domain relatives to data to be transmitted; computing the N symbols $Y_k$ from the symbols $X_k$ according to said formula; generating the N said signals to be emitted on the first antenna from the $X_k$ symbols; generating the N said signals to be emitted on the second antenna from the $Y_k$ symbols.

The invention also concerns a method of radio data reception, from a transmitter comprising at least two transmit antennas, of signals on at least an even number of frequencies, said signals being emitted according methods above, characterized in that said method comprises a step of pairing received signals on said frequencies 'k' with signals received on said frequency 'k+N/2', for k=0 to N/2−1; and a step of applying a space frequency block code decoding module on each pair of received signals according to the space frequency block code used by the emitter to encode signals emitted on said pair of frequencies.

The invention also concerns an emitting device comprising at least two transmit antennas; means to transmit on each antenna at least an even number 'N' strictly greater than 2 of different frequencies; means to emit on a first antenna during a given time slot on each frequency 'k', with k=0 to N−1, a signal representing a complex symbol '$X_k$' in the frequency domain; means to emit on a second antenna during the same time slot, on each frequency 'k', with k=0 to N−1, a signal representing a symbol '$Y_k$'; wherein for each index 'k', with k=0 to N/2−1, symbols '$Y_k$' and '$Y_{k+N/2}$' result from a space frequency block code applied to symbols '$X_k$' and '$X_{k+N/2}$', ck being defined as equal to cos(2πk/N), sk being defined as equal to j sin(2πk/N), said space frequency block code being defined by formula: $Y_k = \epsilon(c_k X_k - s_k X_{k+N/2})$, and $Y_{k+N/2} = \epsilon(-s_k X_{k+ck} X_{k+N/2})$, where ϵ is 1 or −1.

The invention also concerns an emitting device comprising at least two transmit antennas; means to transmit on each antenna at least an even number 'N' strictly greater than 2 of different frequencies, means to emit on a first antenna during a given time slot on each frequency 'k', with k=0 to N−1, a signal representing a complex symbol '$X_k$' in the frequency domain; means to emit on a second antenna during the same time slot, on each frequency 'k', with k=0 to N−1, a signal representing a symbol '$Y_k$'; wherein for each index 'k', with k=0 to N/2−1, symbols '$Y_k$' and '$Y_{k+N/2}$' result from a space frequency block code applied to symbols '$X_k$' and '$X_{k+N/2}$', ck being defined as equal to cos(2πk/N), sk being defined as equal to j sin(2πk/N), said space frequency block code is defined by formula: $Y_k = \epsilon(s_k X_k - c_k X_{k+N/2})$, and $Y_{k+N/2} = \epsilon(-c_k X_{k+sk} X_{k+N/2})$, where ϵ is 1 or −1.

The invention also concerns an emitting device comprising at least two transmit antennas; means to transmit on each antenna at least an even number 'N' strictly greater than 2 of different frequencies; means to emit on a first antenna during a given time slot on each frequency 'k', with k=0 to N−1, a signal representing a complex symbol '$X_k$' in the frequency domain; means to emit on a second antenna during the same time slot, on each frequency 'k', with k=0 to N−1, a signal representing a symbol '$Y_k$'; wherein for each index 'k', with k=0 to N/2−1, symbols '$Y_k$' and '$Y_{k+N/2}$' result from a space frequency block code applied to symbols '$X_k$' and '$X_{k+N/2}$', W being defined as equal to $e^{j2\pi/N}$, d being chosen between 1 and N−1, said space frequency block code is defined by formula: $Y_k = \epsilon W^{-dk} X_{k+N/2}$, $Y_{k+N/2} = \epsilon W^{-d(k+N/2)} X_k$, $\epsilon$ being equal to 1 or −1.

The invention also concerns a receiving device characterized in that it comprises means to receive signals on at least an even number of frequencies from a transmitter comprising at least two transmit antennas, said signals being emitted according to methods above; means to pair received signals on said frequencies 'k' with signals received on said frequency 'k+N/2', for k=0 to N/2−1; means to apply a space frequency block code decoding module on each pair of received signals according to the space frequency block code used by the emitter to encode signals emitted on said pair of frequencies.

The characteristics of the invention will emerge more clearly from a reading of the following description of an example embodiment, the said description being produced with reference to the accompanying drawings, among which:

Figure 1:
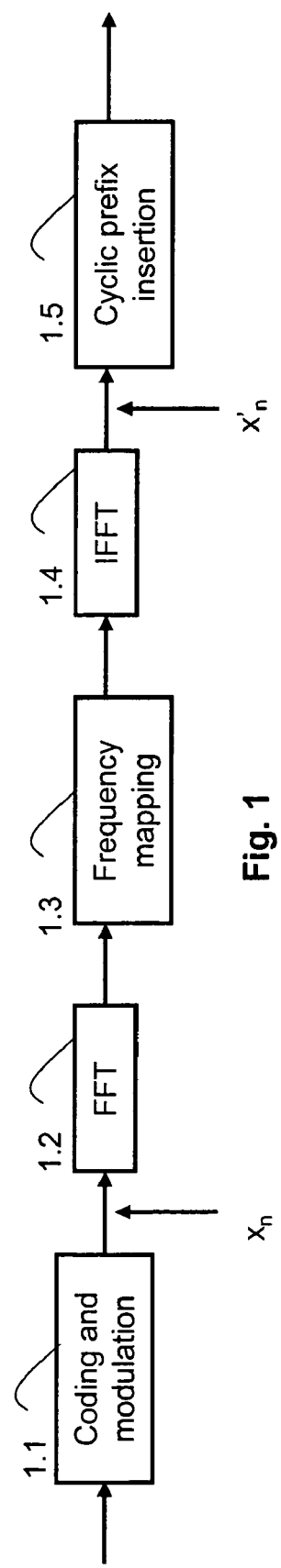
FIG. 1 illustrates the coding implementation in the frequency domain for the transmitter with one emitting antenna.
Figure 2:
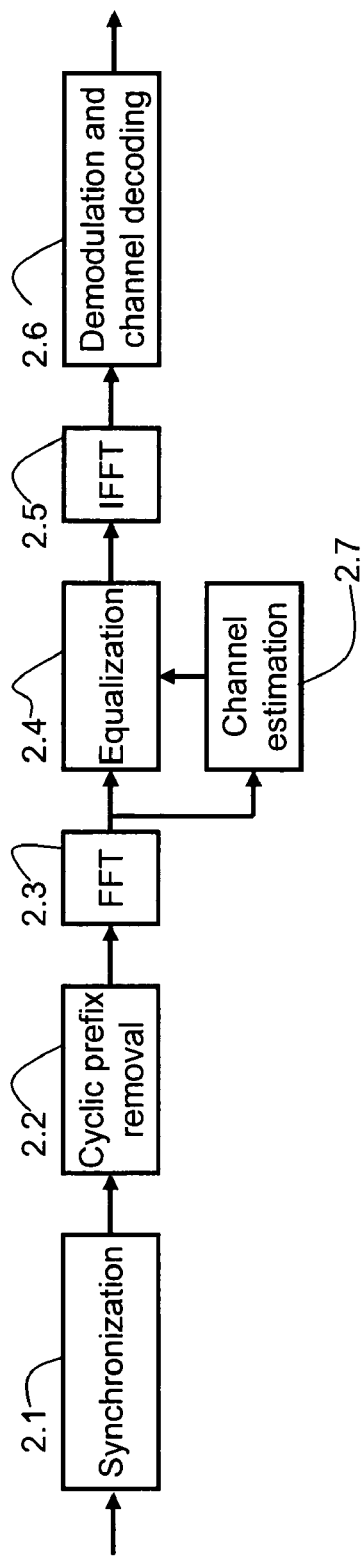
FIG. 2 illustrates the decoding implementation in the frequency domain for the receiver with one transmit antenna and one receive antenna.
Figures 3A, 3B, 4:
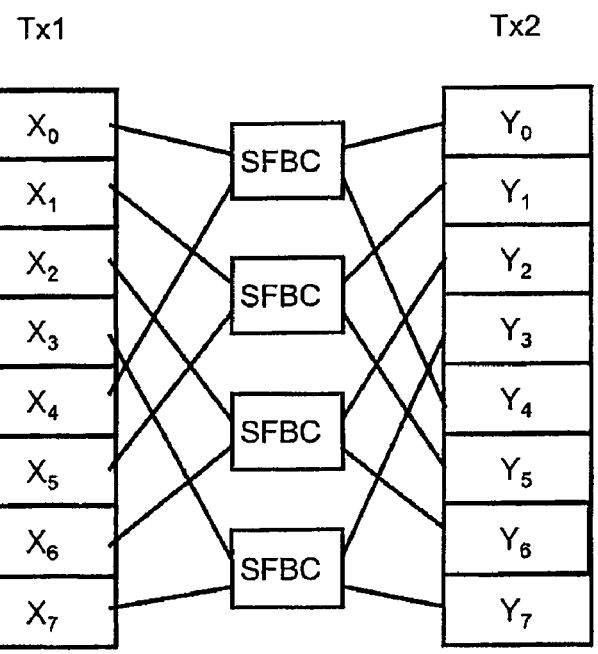

FIG. 3 presents Alamouti codes, in time domain FIG. 3*a* and in frequency domain FIG. 3*b*.

FIG. 4 illustrates a first embodiment for two antennas.

Figure 5:
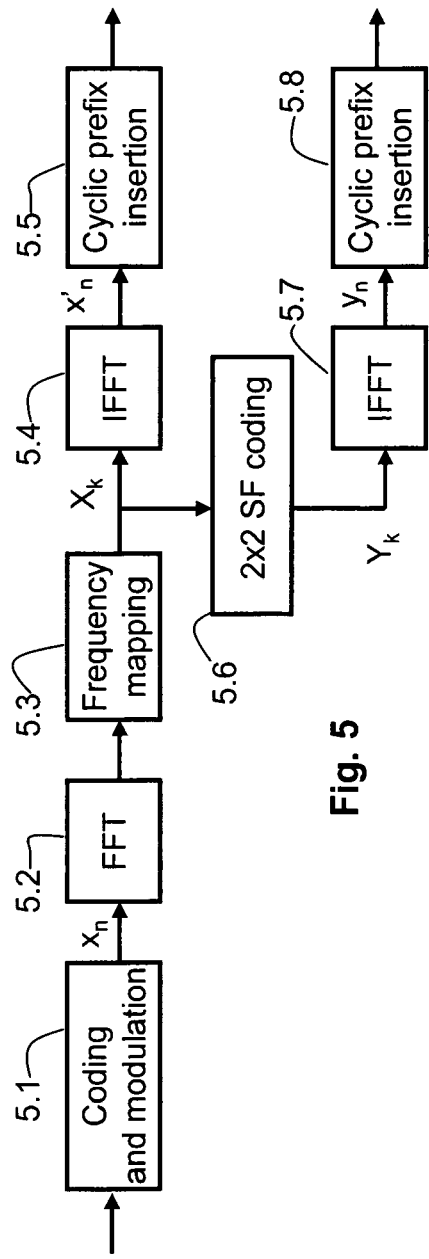

FIG. 5 illustrates the architecture of the encoder for a particular embodiment of the invention in frequency domain.

Figure 6:
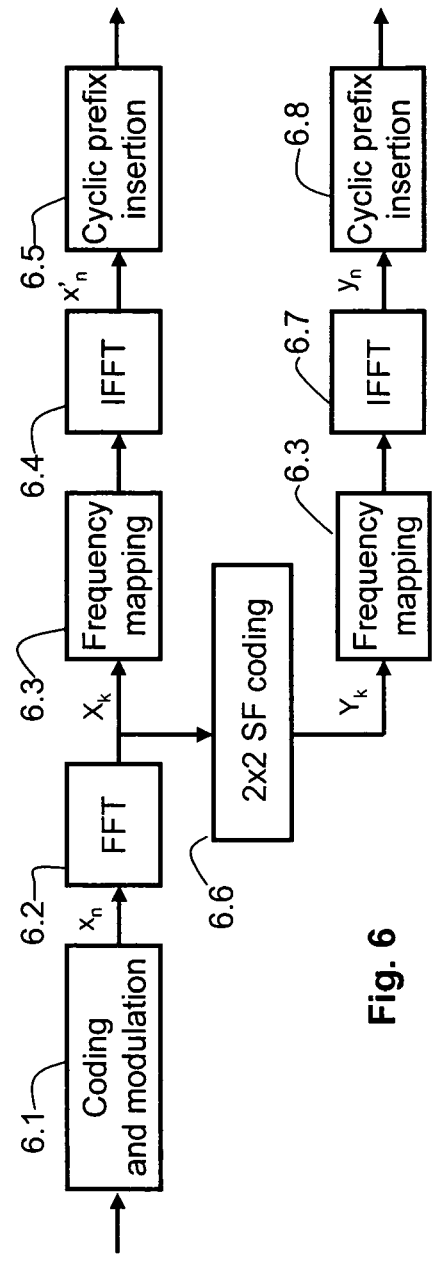

FIG. 6 illustrates the architecture of the encoder for another particular embodiment of the invention in frequency domain.

Figure 7:
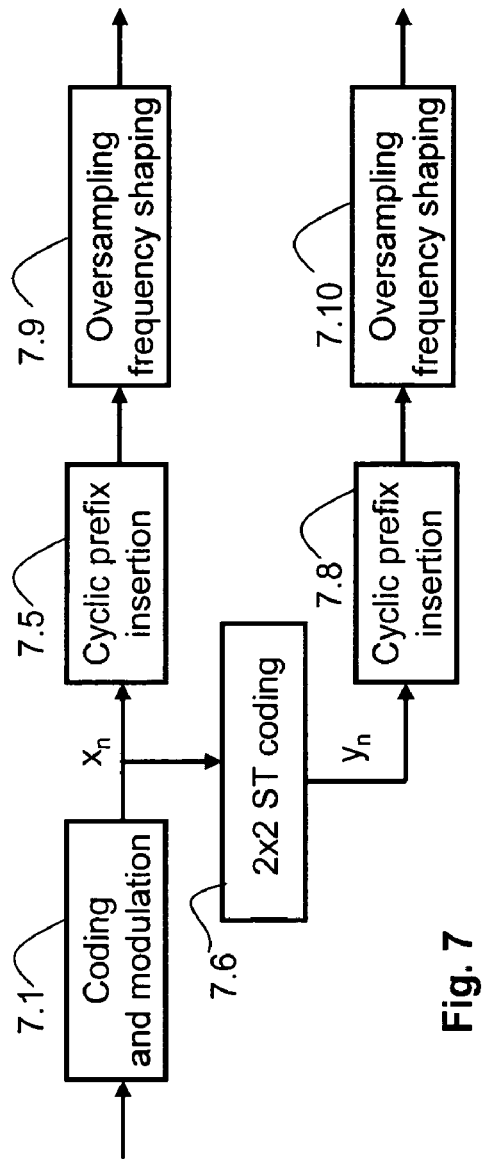

FIG. 7 illustrates the architecture of the encoder for another particular embodiment of the invention in the time domain.

Figure 8:
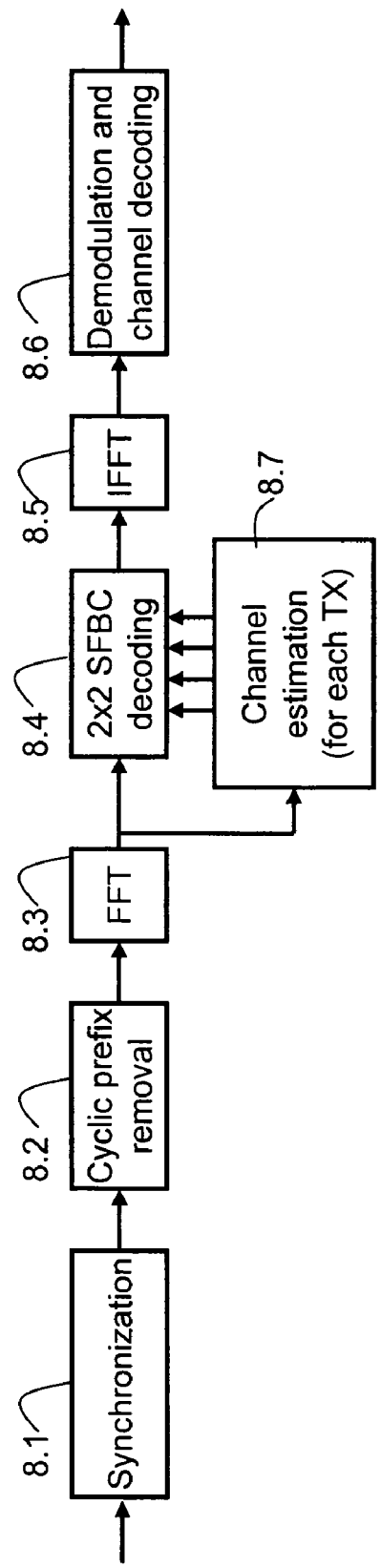

FIG. 8 illustrates the architecture of the decoder of a device having one receive antenna in a particular embodiment of the invention.

Figure 9:
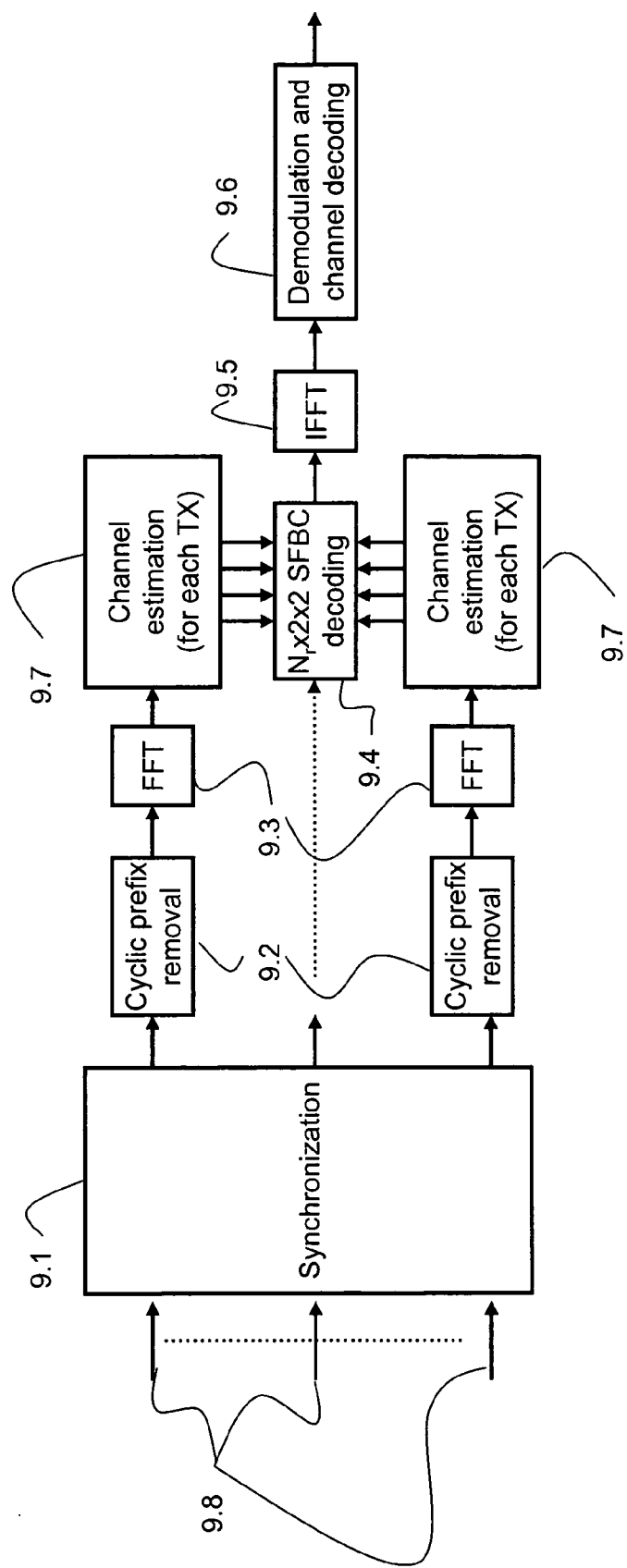

FIG. 9 illustrates the architecture of the decoder of a device having several receive antennas in a particular embodiment of the invention.

Figure 10:
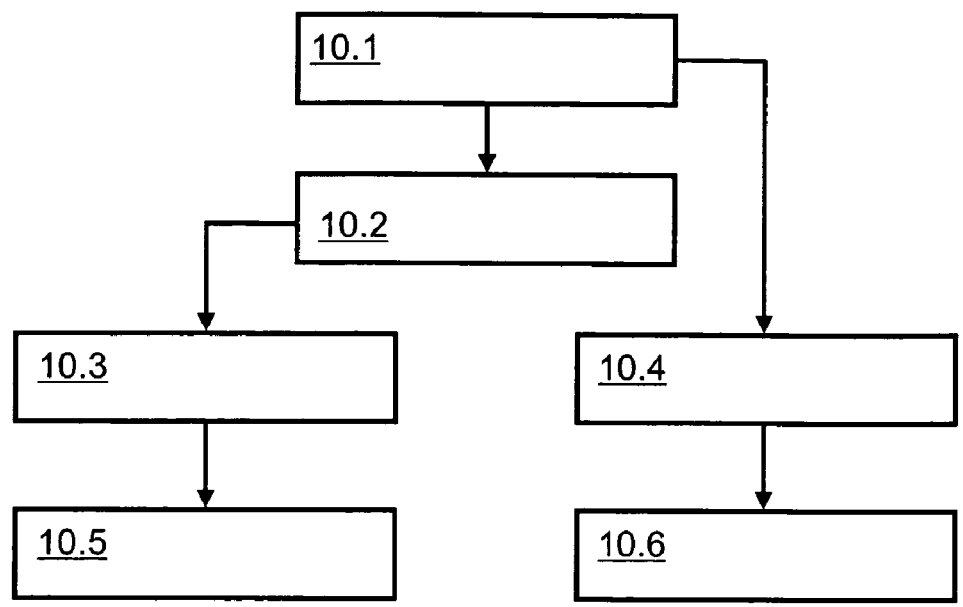

FIG. 10 illustrates the organigram of the emitting method in a particular embodiment of the invention.

Figure 11:
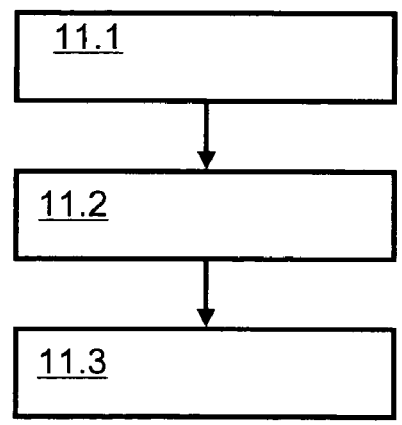

FIG. 11 illustrates the organigram of the receiving method in a particular embodiment of the invention.

As already stated, the problem addressed in this document is to implement a space frequency block code in a transmitting system using at least two transmit antennas. The goal is to propose a space diversity scheme offering good performance while keeping the constant envelope property for signals transmitted on each antenna. Of course the simplicity of implementation, especially for decoding, is also an important point of the solution.

A first diversity scheme, known in the art, is called DD for Delay Diversity. It is a very simple multiple antenna transmission scheme. The second antenna transmits a delayed version of the signal sent by the first antenna. One obvious drawback is that it increases the equivalent channel length seen by the transmitter. In systems with a cyclic prefix, CDD for Cyclic Delay Diversity is preferred. CDD, which is also known, is applicable to systems using a cyclic prefix, e.g. OFDM or DFT-spread OFDM. Each block transmitted by the second antenna, prior to cyclic prefix insertion, is a cyclic rotation of the block sent by the first antenna. It allows increasing the diversity, while using a very simple demodulator. In case of DFT-spread OFDM, the two transmitted signals have a constant envelope. However, performances are not as good as those obtained with e.g. an Alamouti code.

The invention proposes a new family of space frequency block codes offering the constant envelope property and easy to implement. All these space frequency block codes are based on a two by two space frequency block code applied to carrier k and carrier k+N/2 where N is the number of carriers. They all can be described in both the time domain and the frequency domain and lead to a relatively simple decoding in the frequency domain.

FIG. 4 illustrates the scheme of the invention for two antennas, Tx1 and Tx2. The scheme is explained using eight frequencies, without taking into account eventual null subcarrier that could have been added, it extends naturally to any even number of frequencies. Symbols $X_0$ to $X_7$ represent the different symbols sent on the different frequencies via antenna Tx1 at a given time. Using the same numbering for frequencies, one can see that frequency F0 is associated with frequency F4, and frequency F1 is associated with frequency F5, frequency F2 is associated with frequency F6, and frequency F3 is associated with frequency F7. Frequencies k and k+N/2 are paired. A two by two space time block code, represented on the FIG. 4 by the central boxes referenced SFBC, is applied to these frequencies resulting in symbols $Y_k$ and $Y_{k+N/2}$. The code is applied to each pair of frequencies. This arrangement leads to the given transmission on the second antenna Tx2 that transmit in order of frequencies the symbols $Y_k$.

We will now describe some examples of particularly well-suited space frequency block codes that can be used to realize the invention. Each of these codes is expressed in the frequency domain. Theses codes can also be expressed in the time domain, and the corresponding expression in the time domain is also given. They all correspond to the application of a basic two by two code to each pair of frequencies k and k+N/2 resulting in symbols to be emitted by the second antenna on the same pair of frequencies k and k+N/2.

In the following we will adopt the convention:

$$W = e^{j2\pi/N};\ c_k = \cos(2\pi k/N);\ s_k = j\sin(2\pi k/N);$$

Where j is the pure imaginary square root of −1.

A first space frequency block code can be expressed in the frequency domain using the following expression:

$$Y_k = \epsilon(c_k X_k - s_k X_{k+N/2});$$

$$Y_{k+N/2} = \epsilon(-s_k X_k + c_k X_{k+N/2});$$

Which corresponds in the time domain to the expression:

$$y_{2p} = \epsilon x_{2p+1};$$

$$y_{2p} = \epsilon x_{2p};$$

Where $\epsilon$ is 1 or −1. If the number of carriers N is equal to 2, this code corresponds to a classical cyclic delay diversity code. In other cases, it introduces a coding between two different carriers k and k+N/2. Index k+N/2 is taken modulo N. One can see that this code corresponds in the time domain to a simple permutation of two adjacent time symbols.

A second space frequency block code can be expressed in the frequency domain using the following expression:

$$Y_k = \epsilon(s_k X_k - c_k X_{k+N/2});$$

$$Y_{k+N/2} = \epsilon(-c_k X_k + s_k X_{k+N/2});$$

Which corresponds in the time domain to the expression:

$$y_{2p} = \epsilon x_{2p+1};$$

$$y_{2p+1} = -\epsilon x_{2p};$$

Where index k+N/2 is taken modulo N. This code is a modification of the first one introducing a frequency rotation of half the bandwidth in the frequency domain. This is equivalent in the time domain to introduce a multiplication by (−1) of a symbol over two.

A third space frequency block code can be expressed in the frequency domain using the following expression:

$$Y_k = \epsilon W^{-dk} X_{k+N/2};$$

Which corresponds in the time domain to the expression:

$$y_n = \epsilon(-1)^n x_{n-d};$$

Where $\epsilon$ is 1 or −1, d is arbitrary chosen between 0 and N−1 and indexes k+N/2 and n−d are taken modulo N. This code corresponds in the time domain to a cyclic shift of d symbols, as in a cyclic delay diversity code, with an additional inversion of one symbol over two, corresponding to a frequency shift. This additional inversion of symbols constitutes a circular shift of the signal spectrum as emitted on the second antenna. This comes down to emit on the second antenna on carrier k, a phase-shifted version of the signal emitted on the first antenna on carrier k+N/2 modulo N. Thus we introduce a coding between carrier k and k+N/2. In a preferred embodiment, a value of d equal to N/2 is chosen.

We will now describe the implementation of the invention according to a particular embodiment of the invention.

A first variant of the frequency implementation of the encoder is provided in FIG. 5, and a second one in FIG. 6. Data to be transmitted are coded and mapped on symbols by the coding and modulation module 5.1 and 6.1 giving a set of symbols $x_n$. Then the signal is spread in the frequency domain by the FFT (Fast Fourier Transform) module 5.2 and 6.2. Then occurs a module of frequency mapping 5.3 and 6.3 which can comprise zeros insertion, frequency shaping and so on. The signal is transformed back in the time domain by the IFFT (Inverse Fast Fourier Transform) 5.4 and 6.4 for transmission, giving back a set of symbols $x'_n$ very close, if not equal, to the first $x_n$ symbols. An optional cyclic prefix insertion 5.5 and 6.5 can be applied before transmission. A second antenna is feed by data computed by the space frequency block code computation 5.6 and 6.6, leading to a new branch having IFFT, 5.7 and 6.7 and optional cyclic prefix insertion 5.8 and 6.8 as in the first branch. Differences between both implementations are minor, and correspond to the placement of the space frequency coding function, 5.6 and 6.6, relatively to the frequency mapping function 5.3 and 6.3. It must be noted that these implementations are very general, and applicable to any two by two space frequency coding. The core of the invention is the actual two by two space frequency block code used in function 5.6 and 6.6 according to the above given formula.

An implementation in the time domain of the encoder is presented in FIG. 7. Data to be transmitted are coded and mapped on symbols by the coding modulation module 7.1 giving a set of symbols $x_n$. An optional cyclic prefix insertion 7.5 can then be applied to the signal. Then occurs a module of frequency shaping 7.9, which can comprise oversampling, filtering and frequency transposition, before transmission. The module 7.6 applies a time implementation of the code. This module is based on the equivalent formulas in time domain given above. The second branch is subject to the same treatment as the first one with an optional cyclic prefix insertion module 7.8 and an oversampling and frequency-shaping module 7.10.

An implementation of the decoder in the frequency domain is presented in FIG. 8 for one receive antenna, and in FIG. 9 for $N_r$ several receive antennas. In FIG. 8, received data are first synchronized in a module 8.1. If the coder has inserted cyclic prefix, they are removed in a module 8.2. Then a fast Fourier transform 8.3 is applied to transform the signal in the frequency domain. Then an equalization module 8.4 occurs using data relatives to the channel conditions obtained by a module of channel estimation 8.7. The channel estimation is done for each emitting antenna and each frequency used. This equalization module applies the space frequency block decoding to data according to the code used by the encoder. Data are then despread by an inverse fast Fourier transform 8.5 before the demodulation and channel decoding module 8.6. The FIG. 9 illustrates the decoder architecture in the case where several receive antennas are used. Several signals 9.8 are received from the receive antennas. The synchronization module 9.1 synchronizes all these signals. The optional cyclic prefix removal 9.2 is done, if used, in parallel to all the synchronized signals prior to the FFT 9.3 applied also to each signal. $N_r$ modules, possibly one complex module, of channel estimation 9.7 will work on the $N_r$ signals feeding one decoder module 9.4 comprising a $N_r$ by two by two elementary space frequency block decoder serially processing the N/2 pairs of sub-carriers. An inverse FFT module 9.5 before a classical channel decoding 9.6 treats the resulting signal.

To benefit from the characteristics of the invention, the decoding is performed preferably in the frequency dimension. The invention relies partly in the space frequency block code decoding module itself, but also in the possibility to perform this kind of simple decoding, with the space frequency block code decoding module processing one pair of carriers only at a time, the different pairs of carriers being decoded independently one from each other. This last property is not fulfilled by most of the schemes that would have been defined in the time dimension inside one block. On the other hand, a classical Alamouti scheme performed on adjacent sub-carriers will have this property also, but not with the constant envelope characteristic.

Several possibilities exist to decode the SFBC, one of the most used is the MMSE (Minimum Mean Square Error) that will be described hereafter. Concerning the complexity of the SFBC decoding in the multi-antenna case illustrated by FIG. 9, the MMSE decoder will consist, for example, in a matched filter, that is to say multiplication by a complex matrix of size $2 \times 2N_r$, following by the resolution of a 2×2 complex linear system. We will now detail the decoding of MIMO codes, for possibly non-stationary channels. More precisely, a general way of decoding linear codes will be presented.

Let us define the following parameters:
K is the number of information symbols per code word,
N is the number of sub-carriers,
L is the time or frequency dimension, this is to say the number of time slots or number of sub-carriers involved in the space time or space frequency coding. In the frame of the invention, L=2.
Nr is the number of receive antennas,
Nt is the number of transmit antennas.

And let us define the following vectors and matrices:
x is a vector of complex of size K×1 representing information data;
H is a matrix of complex of size L.Nr×L.Nt representing channel response in frequency domain;
Hi is a matrix of complex of size Nr×Nt representing channel response for time slot i or sub-carrier i;
s is a matrix of complex of size Nt×L representing encoded data, in matrix representation;
sv is a vector of complex of size Nt.L×1 representing encoded data, in vector representation: sv=vect (s);
A is a matrix of complex of size L.Nt×K representing the encoding;

y is a vector of complex of size L.Nr×1 representing received data, in vector representation;

v is a vector of complex of size L.Nr×1 representing noise vector;

In classical description of MIMO schemes, it is assumed that the influence of the channel can be modelled by a linear transformation. Practically, for wide band systems, this assumes that this description is performed in the frequency domain. In OFDM or DFT-spread-OFDM systems, or any particular multi-carrier system, this implies that the MIMO scheme is applied to one, for STBC, or a small number L, for SFBC, of sub-carriers. At that point, one must consider STBC and SFBC schemes separately.

In a STBC scheme, for each sub-carrier k, among N transmitted sub-carriers, a space-time, ST, encoding is applied, spread over generally successive L time slots, a time slot corresponding here to an OFDM symbol. If we assume for example that there are 2 transmit antennas Tx0 and Tx1, then $N_t=2$, and L=2 time slots, a symbol $a_{i,j}^k$ will be transmitted on antenna i during the time slot j, for this sub-carrier k. In matrix notation, this corresponds to sending the matrix:

$$s^k = \begin{pmatrix} a_{00}^k & a_{01}^k \\ a_{10}^k & a_{11}^k \end{pmatrix}$$

As far as ST encoding and decoding are concerned, the corresponding N flows are processed in parallel: therefore, for simplicity and without loss of generality, the superscript k will be omitted in the following.

In a SFBC scheme, only one time slot, i.e. one OFDM symbol, is concerned by a particular space-frequency, SF, encoding or decoding. However, N/L SF encoding/decoding will be processed in parallel and independently, each SF encoding being spread on L different sub-carriers. Let us call k the index of the SF encoding, k between 0 and N/L−1. This encoding is applied on the L sub-carriers $k_0, k_1, \ldots, k_{L-1}$. Then, after SF encoding, a symbol $a_{i,k_j}^k$ is transmitted on sub-carrier $k_j$ by the transmit antenna i. If we assume for example that there are 2 transmit antennas Tx0 and Tx1 ($N_t=2$), and that L=2 sub-carriers are used for each SF encoding, this corresponds to sending the matrix:

$$s^k = \begin{pmatrix} a_{0,k0}^k & a_{0,k1}^k \\ a_{1,k0}^k & a_{1,k1}^k \end{pmatrix}$$

As long as SF encoding and decoding are concerned, the corresponding N/L flows are processed in parallel: therefore, for simplicity and without loss of generality, the superscripts $k_i$ will be omitted in the following, and we will consider that the matrix s is sent:

$$s = \begin{pmatrix} a_{00} & a_{01} \\ a_{10} & a_{11} \end{pmatrix}$$

The encoded data of a space-time or space-frequency (ST/SF) code can be represented in matrix or vector form. The more natural way to describe the encoding is with the matrix form, as used above. Indeed, this matrix form generally leads to an easier representation of the encoding process itself. However, the vector form will be used for, in the following, it simplifies the representation of the channel and of the decoding. In the following, a vector is obtained from a matrix by superposing the different columns of it.

For example, if s and sv are the matrix and vector representations of the encoded data, then $$sv[i+j*N_t] = s[i][j],$$

that can be illustrated in the SFBC case by:

$$s = \begin{bmatrix} a_{00} & a_{01} \\ a_{10} & a_{11} \end{bmatrix} \Rightarrow sv = \begin{bmatrix} a_{00} \\ a_{10} \\ a_{01} \\ a_{11} \end{bmatrix} \begin{array}{l} \rightarrow \text{antenna 0, frequency 0} \\ \rightarrow \text{antenna 1, frequency 0} \\ \rightarrow \text{antenna 0, frequency 1} \\ \rightarrow \text{antenna 1, frequency 1} \end{array}$$

Linear ST/SF codes represent an important category of codes, and the codes proposed in the frame of this invention fall in this category. In a very general sense, the linear ST/SF encoding can be represented by the following complex representation:

$$sv = Ax,$$

Where x is the information under vector form prior to ST/SF encoding.

Let us present the channel representation. In the frequency domain, we assume that at a given instant and a given frequency, i.e. a given sub-carrier, the channel can be modelled by a simple multiplicative coefficient. In a SISO case, this means that at sub-carrier i, the received sample is equal to:

$$y_i = H_i a_i + \text{noise},$$

Where $H_i$ is a complex coefficient in this SISO case, and $a_i$ is the transmitted value.

The formulas for the MIMO case derive directly from this model. For example, for SFBC case, at sub-carrier i and at the receive antenna j, the received sample is equal to:

$$y_i(j) = \sum_{l=0}^{N_t-1} H_i(j, l) a_{l,i} + \text{noise},$$

Where $H_i(j,l)$ is a complex coefficient corresponding to the frequency channel response between antennas l and j at frequency i, and $a_{l,i}$ is the data transmitted at sub-carrier i by transmit antenna l.

Therefore, the channel can be represented by a matrix of the form:

$$H = \begin{bmatrix} H_0 & 0 & 0 \\ 0 & \ddots & 0 \\ 0 & 0 & H_{L-1} \end{bmatrix},$$

Where matrix $H_i$ is the channel's frequency response at time i (STBC case) or frequency i (sub-carrier $k_i$, SFBC case), and when the entry (j,l) of matrix $H_i$ corresponds to the channel coefficient between transmit antenna l and receive antenna j. When the channel is stationary, all $H_i$ matrices are equal.

It follows that the received complex vector is equal to:

y=H sv+v=HA x+V, where v is the additive white Gaussian noise.

Keeping in mind that other representations of the MMSE decoder exist, we will present a description of the MMSE decoder in the complex domain.

From the above, the MMSE formulation is very simple. The receiver vector can be reformulated as:

$$y = Cx + v, \text{ with } C = HA$$

It follows directly that the MMSE estimator of x is equal to:

$$z = \hat{x} = (C^H C + \sigma^2 I_K)^{-1} C^H y$$

Where $\sigma^2$ is the variance of the complex noise v and $I_K$ the identity matrix of size K and where $C^H$ stands for the conjugate transpose of C.

It is worthwhile noting that whatever the number of antennas or the number of time slots (or the number of sub-carriers), only a complex matrix of size K has to be inverted.

For the specific SF codes mentioned in the document previously, and for two transmit antennas, we will now detail the s, sv and A matrices.

In this case, we have $N_t=2$, $K=2$, $L=2$, $N_r$ variable.

For the first code we get:

$$s = \begin{bmatrix} x_0 & \varepsilon(c_k x_0 - s_k x_1) \\ x_1 & \varepsilon(-s_k x_0 + c_k x_1) \end{bmatrix},$$

$$sv = \begin{bmatrix} x_0 \\ x_1 \\ \varepsilon(c_k x_0 - s_k x_1) \\ \varepsilon(-s_k x_0 + c_k x_1) \end{bmatrix},$$

$$A = \begin{bmatrix} 1 & 0 \\ 0 & 1 \\ \varepsilon c_k & -\varepsilon s_k \\ -\varepsilon s_k & \varepsilon c_k \end{bmatrix}.$$

For the second code we get:

$$s = \begin{bmatrix} x_0 & \varepsilon(s_k x_0 - c_k x_1) \\ x_1 & \varepsilon(-c_k x_0 + s_k x_1) \end{bmatrix},$$

$$sv = \begin{bmatrix} x_0 \\ x_1 \\ \varepsilon(s_k x_0 - c_k x_1) \\ \varepsilon(-c_k x_0 + s_k x_1) \end{bmatrix},$$

$$A = \begin{bmatrix} 1 & 0 \\ 0 & 1 \\ \varepsilon s_k & -\varepsilon c_k \\ -\varepsilon c_k & \varepsilon s_k \end{bmatrix}.$$

And for the third code, we get:

$$s = \begin{bmatrix} x_0 & \varepsilon W^{-dk} x_1 \\ x_1 & \varepsilon W^{-d(k+N/2)} x_0 \end{bmatrix},$$

$$sv = \begin{bmatrix} x_0 \\ x_1 \\ \varepsilon W^{-dk} x_1 \\ \varepsilon W^{-d(k+N/2)} x_0 \end{bmatrix},$$

$$A = \begin{bmatrix} 1 & 0 \\ 0 & 1 \\ \varepsilon W^{-dk} x_1 & 0 \\ 0 & \varepsilon W^{-d(k+N/2)} x_0 \end{bmatrix}.$$

FIG. 10 illustrates the organigram of the emitting method in the frequency domain according to a particular embodiment of the invention. Step 10.1 is the step of obtaining the N symbols $X_k$ in the frequency domain relatives to data to be transmitted. Step 10.2 is the step of computing the N symbols $Y_k$ from the symbols $X_k$ according to one of the previously described formulas. Step 10.4 is the step of generating the N, or N' greater than N in the case of zero insertion as already mentioned, said signals to be emitted on the first antenna from the $X_k$ symbols. Step 10.3 is the step of generating the N, or N', said signals $y_n$ to be emitted on the second antenna from the $Y_k$ symbols. In step 10.6 signals representing the $x_n$ symbols are emitted on the first antenna while signals representing the $y_n$ symbols are emitted on the second antenna in step 10.5.

FIG. 11 illustrates the organigram of the receiving method, in the case of one receive antenna, in a particular embodiment of the invention. Step 11.1 is the step of obtaining the N received symbols in the frequency domain relatives to data that have been transmitted. Step 11.2 is the step of applying a space frequency decoding module on each pair of received signals according to the space frequency block code used by the emitter to encode signals emitted on said pair of frequencies. In a step 11.3 an estimation of $x_n$ symbols in time domain is obtained from the above estimated symbols in the frequency domain.

The MIMO scheme described with two antennas can be extended to any even number of antennas. The extension is done by grouping the antenna by pair and to apply one of the coding schemes, as defined in the invention, to each pair of antennas.

The invention can be applied to any transmission system that will use several transmitters. It is very likely to concern wireless systems; however, it could be used e.g. to line transmissions in which crossover interference would occur. Moreover, it was described in DFT-spread OFDM context. However, any modulation scheme could use the proposed invention, even if a real benefit will only occur for modulations with a constant envelope. Concerning the cyclic prefix, it simplifies the receiver implementation in the frequency domain. However, other frequency domain implementation of the receiver should be possible without it, even if it would be more complex. Examples of such implementation are overlap methods (e.g. overlap-add or overlap-save). In overlap-save method, N samples will be treated in the frequency domain and transform in the time domain, and only some of them will be kept in the time domain. The corresponding treatment windows are overlapping to insure that all the received samples are treated.

The invention claimed is:

1. A method of radio data emission, by an emitter including at least two transmit antennas, each antenna transmitting on at least an even number 'N', strictly greater than 2, of different frequencies, comprising:

emitting, on a first antenna and during a given time slot on each frequency 'k', with k=0 to N−1, a signal representing a complex symbol '$X_k$' in the frequency domain; and emitting, on a second antenna and during the same time slot, on each frequency 'k', with k=0 to N−1, a signal representing a symbol '$Y_k$', wherein for each index 'k', with k=0 to N/2−1, symbols '$Y_k$' and '$Y_{k+N/2}$' result from a space frequency block code applied to symbols '$X_k$' and '$X_{k+N/2}$', ck being defined as equal to $\cos(2\pi k/N)$, sk being defined as equal to $j \sin(2\pi k/N)$, said space frequency block code being defined by a formula: $Y_k = \varepsilon(c_k X_k - s_k X_{k+N/2})$, and $Y_{k+N/2} = \varepsilon(-s_k X_k + c_k X_{k+N/2})$, and $\varepsilon$ is 1 or −1.

2. A method of radio data emission, by an emitter including at least two transmit antennas, each antenna transmitting on at least an even number 'N', strictly greater than 2, of different frequencies, comprising:

emitting, on a first antenna and during a given time slot on each frequency 'k', with k=0 to N−1, a signal representing a complex symbol '$X_k$' in the frequency domain; and emitting, on a second antenna and during the same time slot, on each frequency 'k', with k=0 to N−1, a signal representing a symbol '$Y_k$', wherein for each index 'k', with k=0 to N/2−1, symbols '$Y_k$' and '$Y_{k+N/2}$' result from a space frequency block code applied to symbols '$X_k$' and '$X_{k+N/2}$', ck being defined as equal to $\cos(2\pi k/N)$, sk being defined as equal to $j\sin(2\pi k/N)$, said space frequency block code being defined by a formula: $Y_k=\epsilon(s_k X_k - c_k X_{k+N/2})$, and $Y_{k+N/2}=\epsilon(-c_k X_k + s_k X_{k+N/2})$, and $\epsilon$ is 1 or −1.

3. A method of radio data emission, by an emitter including at least two transmit antennas, each antenna transmitting on at least an even number 'N', strictly greater than 2, of different frequencies, comprising:

emitting on a first antenna and during a given time slot on each frequency 'k', with k=0 to N−1, a signal representing a complex symbol '$X_k$' in the frequency domain; and emitting on a second antenna and during the same time slot, on each frequency 'k', with k=0 to N−1, a signal representing a symbol '$Y_k$', wherein for each index 'k', with k=0 to N/2−1, symbols '$Y_k$' and '$Y_{k+N/2}$' result from a space frequency block code applied to symbols '$X_k$' and '$X_{k+N/2}$', W being defined as equal to $e^{j2\pi/N}$, d being chosen between 1 and N−1, said space frequency block code being defined by a formula: $Y_k=\epsilon W^{-dk} X_{k+N/2}, Y_{k+N/2}=\epsilon W^{-d(k+N/2)} X_k$, and $\epsilon$ is 1 or −1.

4. A method according to claim 3, wherein d is equal to N/2.

5. A method according to claim 1, further comprising:

obtaining the N symbols $X_k$ in the frequency domain relative to data to be transmitted;

computing the N symbols $Y_k$ from the symbols $X_k$ according to said formula;

generating the N signals to be emitted on the first antenna from the $X_k$ symbols; and generating the N signals to be emitted on the second antenna from the $Y_k$ symbols.

6. A method of radio data reception, from a transmitter including at least two transmit antennas, of signals on at least an even number of frequencies, the signals being emitted according to claim 1, the method comprises:

pairing received signals on said frequencies 'k' with signals received on said frequency 'k+N/2', for k=0 to N/2−1; and applying a space frequency block code decoding module on each pair of received signals according to the space frequency block code used by the emitter to encode signals emitted on said pair of frequencies.

7. An emitting device comprising:

at least two transmit antennas;

means for transmitting, on each antenna at least an even number 'N' strictly greater than 2 of different frequencies;

means for emitting, on a first antenna and during a given time slot on each frequency 'k', with k=0 to N−1, a signal representing a complex symbol '$X_k$' in the frequency domain; and means for emitting, on a second antenna and during the same time slot, on each frequency , on each frequency 'k', with k=0 to N−1, a signal representing a symbol '$Y_k$', wherein for each index 'k', with k=0 to N/2−1, symbols '$Y_k$' and '$Y_{k+N/2}$' result from a space frequency block code applied to symbols '$X_k$' and '$X_{k+N/2}$', ck being defined as equal to $\cos(2\pi k/N)$, sk being defined as equal to $j\sin(2\pi k/N)$, said space frequency block code being defined by formula: $Y_k=\epsilon(c_k X_k - s_k X_{k+N/2})$, and $Y_{k+N/2}=\epsilon(-s_k X_k + c_k X_{k+N/2})$, and $\epsilon$ is 1 or −1.

8. An emitting device comprising:

at least two transmit antennas;

means for transmitting, on each antenna, at least an even number 'N' strictly greater than 2 of different frequencies;

means for emitting, on a first antenna and during a given time slot on each frequency 'k', with k=0 to N−1, a signal representing a complex symbol '$X_k$' in the frequency domain; and means for emitting, on a second antenna and during the same time slot, on each frequency 'k', with k=0 to N−1, a signal representing a symbol '$Y_k$', wherein for each index 'k', with k=0 to N/2−1, symbols '$Y_k$' and '$Y_{k+N/2}$' result from a space frequency block code applied to symbols '$X_k$' and '$X_{k+N/2}$', ck being defined as equal to $\cos(2\pi k/N)$, sk being defined as equal to $j\sin(2\pi k/N)$, said space frequency block code being defined by a formula: $Y_k=\epsilon(s_k X_k - c_k X_{k+N/2})$, and $Y_{k+N/2}=\epsilon(-c_k X_k + s_k X_{k+N/2})$, and $\epsilon$ is 1 or −1.

9. An emitting device comprising:

at least two transmit antennas;

means for transmitting, on each antenna at least an even number 'N' strictly greater than 2 of different frequencies;

means for emitting, on a first antenna and during a given time slot on each frequency 'k', with k=0 to N−1, a signal representing a complex symbol '$X_k$' in the frequency domain; and means for emitting, on a second antenna and during the same time slot, on each frequency 'k', with k=0 to N−1, a signal representing a symbol '$Y_k$', wherein for each index 'k', with k=0 to N/2−1, symbols '$Y_k$' and '$Y_{k+N/2}$' result from a space frequency block code applied to symbols '$X_k$' and '$X_{k+N/2}$', W being defined as equal to $e^{j2\pi/N}$, d being chosen between 1 and N−1, said space frequency block code being defined by a formula: $Y_k=\epsilon W^{-dk} X_{k+N/2}, Y_{k+N/2}=\epsilon W^{-d(k+N/2)} X_k$, and $\epsilon$ is 1 or −1.

10. A receiving device, comprising:

means for receiving signals on at least an even number 'N', strictly greater than 2, of different frequencies;

means for pairing received signals on said frequencies 'k' with signals received on said frequency 'k+N/2', for k=0 to N/2−1; and means for decoding a space frequency block code on each pair of received signals according to a space frequency block code used by an emitter to encode said signals emitted on said pair of frequencies.

11. A receiving device according to claim 10, wherein the means for decoding decodes the space frequency block code used by the emitter to encode said signals, the encoding being defined by a formula: $Y_k=\epsilon(c_k X_k - s_k X_{k+N/2})$, and $Y_{k+N/2}=\epsilon(-s_k X_k + c_k X_{k+N/2})$, wherein $\epsilon$ is 1 or −1, ck is defined as equal to $\cos(2\pi k/N)$, sk is defined as equal to $j\sin(2\pi k/N)$, and for each index k=0 to N/2−1, symbols '$Y_k$' and '$Y_{k+N/2}$' result from the formula being applied to symbols and '$X_k$' and '$X_{k+N/2}$'.

12. A receiving device according to claim 10, wherein the means for decoding decodes the space frequency block code used by the emitter to encode said signals, the encoding being defined by a formula: $Y_k=\epsilon(s_kX_k-c_kX_{k+N/2})$, and $Y_{k+N/2}=\epsilon(-c_kX_k+s_kX_{k+N/2})$, wherein $\epsilon$ is 1 or −1, ck is defined as equal to $\cos(2\pi k/N)$, sk is defined as equal to $j\sin(2\pi k/N)$, and for each index k=0 to N/2−1, symbols '$Y_k$' and '$Y_{k+N/2}$' result from the formula applied to symbols '$X_k$' and '$X_{k+N/2}$'.

13. A receiving device according to claim 10, wherein the means for decoding decodes the space frequency block code used by the emitter to encode said signals, the encoding being defined by formula: $Y_k=\epsilon W^{-dk}X_{k+N/2}, Y_{k+N/2}=\epsilon W^{-d(k+N/2)}X_k$, wherein $\epsilon$ is equal to 1 or −1, ck is defined as equal to $\cos(2\pi k/N)$, sk is defined as equal to $j\sin(2\pi k/N)$, and for each index k=0 to N/2−1, symbols '$Y_k$' and '$Y_{k+N/2}$' result from the formula being applied to symbols '$X_k$' and '$X_{k+N/2}$'.

14. An emitting device, comprising:
at least two transmit antennas;
a transmitter that transmits, on each antenna, at least an even number 'N' strictly greater than 2 of different frequencies;
a first emitter that emits, on a first antenna and during a given time slot on each frequency 'k', with k=0 to N−1, a signal representing a complex symbol '$X_k$' in the frequency domain; and
a second emitter that emits, on a second antenna and during the same time slot, on each frequency 'k', with k=0 to N−1, a signal representing a symbol '$Y_k$',
wherein for each index 'k', with k=0 to N/2−1, symbols '$Y_k$' and '$Y_{k+N/2}$' result from a space frequency block code applied to symbols '$X_k$' and '$X_{k+n/2}$', ck being defined as equal to $\cos(2\pi k/N)$, sk being defined as equal to $j\sin(2\pi k/N)$, said space frequency block code being defined by formula: $Y_k\epsilon(C_kX_ks_kX_{k+N/2})$, and $Y_{k+N/2}=\epsilon(-s_kX_k+c_kX_{k+N/2})$, and $\epsilon$ is 1 or −1.

15. An emitting device, comprising:
at least two transmit antennas;
a transmitter that transmits, on each antenna, at least an even number 'N' strictly greater than 2 of different frequencies;
a first emitter that emits, on a first antenna and during a given time slot on each frequency 'k', with k=0 to N−1, a signal representing a complex symbol '$X_k$' in the frequency domain; and
a second emitter that emits, on a second antenna and during the same time slot, on each frequency 'k', with k=0 to N−1, a signal representing a symbol '$Y_k$',
wherein for each index 'k', with k=0 to N/2−1, symbols '$Y_k$' and '$Y_{k+n/2}$' result from a space frequency block code applied to symbols '$X_k$' and '$X_{k+N/2}$', ck being defined as equal to $\cos(2\pi k/N)$, sk being defined as equal to $j\sin(2\pi k/N)$, said space frequency block code being defined by formula: $Y_k=\epsilon(s_kX_k-c_kX_{k+N/2})$, and $Y_{k+N/2}=\epsilon(-c_kX_k+s_kX_{k+N/2})$, and $\epsilon$ is 1 or −1.

16. An emitting device, comprising:
at least two transmit antennas;
a transmitter that transmits, on each antenna, at least an even number 'N' strictly greater than 2 of different frequencies;
a first emitter that emits, on a first antenna and during a given time slot on each frequency 'k', with k=0 to N−1, a signal representing a complex symbol '$X_k$' in the frequency domain; and
a second emitter that emits, on a second antenna and during the same time slot, on each frequency 'k', with k=0 to N−1, a signal representing a symbol '$Y_k$',
wherein for each index 'k', with k=0 to N/2−1, symbols '$Y_k$' and '$Y_{k+N/2}$' result from a space frequency block code applied to symbols '$X_k$' and '$X_{k+N/2}$', W being defined as equal to $e^{j2\pi/N}$, d being chosen between 1 and N−1, said space frequency block code being defined by formula: $Y_k=\epsilon W^{-dk}X_{k+N/2}, Y_{k+N/2}=\epsilon W^{-d(k+N/2)}X_k$, and $\epsilon$ is 1 or −1.

17. A receiving device, comprising:
a receiver that receives signals on at least an even number 'N', strictly greater than 2 of different frequencies;
a pairer that pairs received signals on said frequencies 'k' with signals received on said frequency 'k+N/2', for k=0 to N/2−1; and
a decoder that decodes a space frequency block code on each pair of received signals according to a space frequency block code used by an emitter to encode said signals emitted on said pair of frequencies.

18. A receiving device according to claim 17, wherein the decoder decodes the space frequency block code used by the emitter to encode said signals, the encoding being defined by a formula: $Y_k=\epsilon(c_kX_k-s_kX_{k+N/2})$, and $Y_{k+N/2}=\epsilon(-s_kX_k+c_kX_{k+N/2})$, wherein $\epsilon$ is 1 or −1, ck is defined as equal to $\cos(2\pi k/N)$, sk is defined as equal to $j\sin(2\pi k/N)$, and for each index k=0 to N/2−1, symbols '$Y_k$' and '$Y_{k+N/2}$' result from the formula being applied to symbols '$X_k$' and '$X_{k+N/2}$'.

19. A receiving device according to claim 17, wherein the decoder decodes the space frequency block code used by the emitter to encode said signals, the encoding being defined by a formula: $Y_k=\epsilon(s_kX_k-c_kX_{k+N/2})$, and $Y_{k+N/2}=\epsilon(-c_kX_k+s_kX_{k+N/2})$, wherein $\epsilon$ is 1 or −1, ck is defined as equal to $\cos(2\pi k/N)$, sk is defined as equal to $j\sin(2\pi k/N)$, and for each index k=0 to N/2−1, symbols '$Y_k$' and '$Y_{k+N/2}$' result from the formula applied to symbols '$X_k$' and '$X_{k+N/2}$'.

20. A receiving device according to claim 17, wherein the decoder decodes the space frequency block code used by the emitter to encode said signals, the encoding being defined by formula: $Y_k=\epsilon W^{-dk}X_{k+N/2}, Y_{k+N/2}=\epsilon W^{-d(k+N/2)}X_k$, wherein $\epsilon$ is equal to 1 or −1, ck is defined as equal to $\cos(2\pi k/N)$, sk is defined as equal to $j\sin(2\pi k/N)$, and for each index k=0 to N/2−1, symbols '$Y_k$' and '$Y_{k+N/2}$' result from the formula being applied to symbols '$X_k$' and '$X_{k+N/2}$'.

* * * * *